C. F. HUMMEL.
CUTTING AND WELDING TORCH.
APPLICATION FILED APR. 12, 1920.
1,390,440.
Patented Sept. 13, 1921.
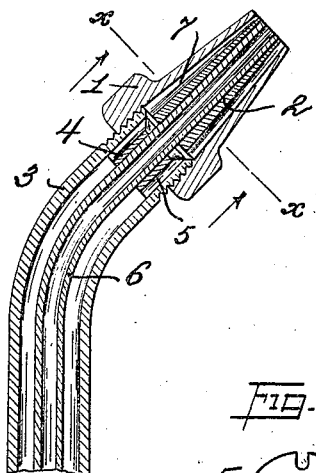
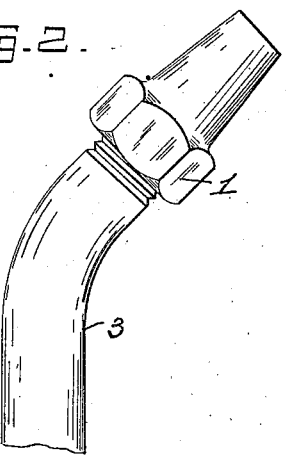
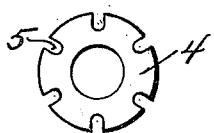
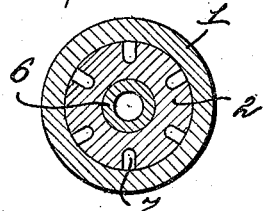
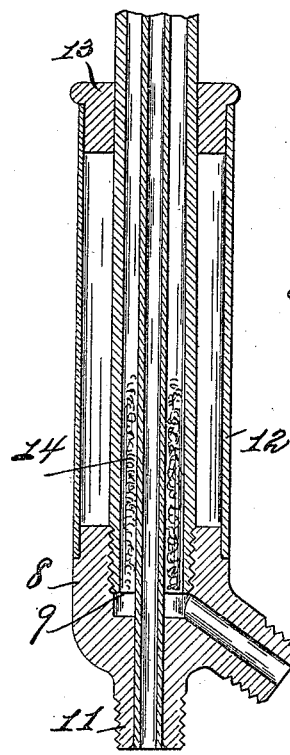
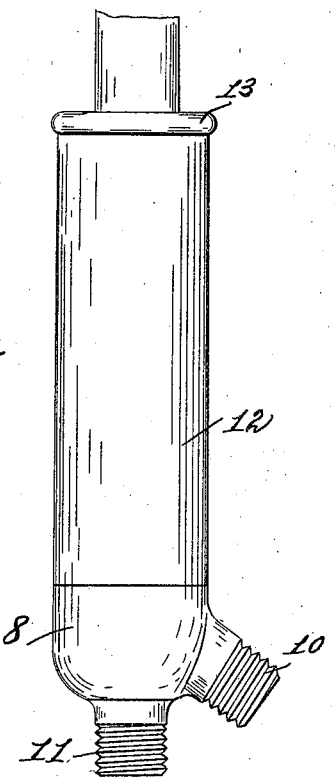
INVENTOR
Charles F. Hummel,
BY
Fred C. Fischer
ATTORNEY

UNITED STATES PATENT OFFICE.

CHARLES F. HUMMEL, OF ROSELLE PARK, NEW JERSEY.

CUTTING AND WELDING TORCH.

1,390,440.  Specification of Letters Patent.  Patented Sept. 13, 1921.

Application filed April 12, 1920. Serial No. 373,135.

*To all whom it may concern:*

Be it known that I, CHARLES F. HUMMEL, a citizen of the United States, residing in the borough of Roselle Park, in the county of Union and State of New Jersey, have invented certain new and useful Improvements in Cutting and Welding Torches, of which the following is a full, clear, and exact description, such as will enable others skilled in the art to which it pertains to make, construct, and use the same, reference being had to the accompanying drawings and to the reference characters marked thereon.

This invention relates to improvements in cutting and welding torches for cutting and welding metals by means of a flame produced by the ignition of two gases, near the point of combustion; the object being to provide improved means for conveying the gases to the nozzle, and to simplify the structure of the torch, so as to render the same positive yet effective in operation, simple and inexpensive in construction and durable in use.

These objects I perform in the preferred embodiment of my invention, which I have illustrated in the accompanying drawings, to which reference is had and in which similar reference characters indicate corresponding parts in the several views.

In the drawings,

Figure 1 represents, a side elevation of my improved device in section.

Fig. 2 represents, the same in elevation.

Fig. 3 represents, on an enlarged scale, a detailed view of the disk; and

Fig. 4 represents, also on an enlarged scale, a transverse sectional view taken on line *x—x* of Fig. 1, looking in the direction indicated by the arrow.

In the drawings, 1 designates a chambered torch-head or nozzle, one end of which is provided with a tapered chamber to receive the adjustable tapered plug 2, and the other end is internally screw-threaded to receive the corresponding screw-threaded end of the hydrogen or acetylene-gas supply pipe 3. Rigidly secured within the end of the hydrogen or acetylene-gas supply pipe 3, is an apertured disk 4, the face of which is provided with a series of gas conveying grooves or passages 5 extending across the entire face thereof. The adjustable tapered plug 2 is provided with a longitudinally arranged bore which is in alinement with the aperture of the disk 4 and through which the oxygen supply pipe 6 passes said oxygen supply-pipe 6, as clearly indicated in the drawings, being located within the hydrogen or acetylene-gas supply-pipe 3 and which extends clear through to the tapered end of the plug 2.

The face of the tapered plug 2 is provided with a corresponding series of gas conveying grooves or passages 7, similarly arranged on its face as the gas conveying grooves or passages 5 of the disk 4, and with which they are adapted to register to enable the hydrogen or acetylene-gas to be regulated and to pass through said grooves in the disk and tapered plug to be discharged from the outer end of the nozzle.

It will thus be seen that a supply of hydrogen or acetylene-gas is supplied through the supply pipe 3 to the end of the nozzle 1 by means of the apertured disk 4 and the tapered plug 2 which is provided with the gas conveying grooves or passages 7.

It is to be noticed that the oxygen supply-pipe 6 extends from the very beginning of the nozzle 1 to the very end of the device, through the handle 8 in which it is rigidly secured.

One end of the hydrogen or acetylene-gas supply pipe 3 is screw-threaded and has screw-threaded engagement with a screw-threaded cavity 9 formed in the handle 8, through which the oxygen supply-pipe 6 also passes.

The handle 8 is further provided with extended screw-threaded nipples 10 and 11, each of which is designed to connect respectively with sources of supply of acetylene and oxygen by any suitable and desired means.

Secured to a shouldered portion of the handle 8 is one end of a tube 12 preferably made of fiber, the other end of which is secured to the circular apertured member 3 in any desired or convenient manner, through which the hydrogen or acetylene-gas supply-pipe 3 passes.

The hydrogen or acetylene-gas supply-pipe 3 as clearly indicated in Fig. 1 of the drawings, is packed with a finely divided pervious non-inflammable material 14 preferably asbestos, glass wool or the like.

This inflammable material or packing provides a restricted passage way for the gas and also minimizes the danger of the propagation of the flame through the gas.

It will, of course, be understood that though I prefer to use acetylene and oxygen in my torch, any other appropriate combustible gas may be substituted for the acetylene, and any other appropriate gaseous supporter of combustion for the oxygen.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim as new and desire to secure by Letters Patent is:—

1. A gas torch for cutting and welding metals, comprising a head provided with a tapered chamber, a grooved tapered plug located within said chamber, a gas supply-pipe secured in the end of said head, an independent apertured disk provided with grooves located in the end of said gas supply-pipe, and a second gas supply-pipe of smaller diameter passing through the entire length of the first named gas supply-pipe and through said apertured disk and projecting into the outer-most end of said tapered plug.

2. A gas torch for cutting and welding metals, comprising a head provided with a tapered chamber, a tapered plug provided with grooves located within said chamber, a gas supply-pipe secured within the end of said head, and a second gas supply-pipe of smaller diameter passing through the entire length of the first named gas supply-pipe and terminating in the outer-most end of said tapered plug.

3. A gas torch for cutting and welding metals, comprising a head provided with a tapered chamber, a grooved tapered plug provided with a central longitudinal bore located within said chamber, a gas supply-pipe secured in the end of said head, an independent disk located in the end of said gas supply-pipe, said disk and plug being provided with registering gas passages communicating with said supply-pipe, and a second gas supply-pipe of smaller diameter passing through the entire length of the first named gas supply-pipe and through said apertured disk and through the longitudinally arranged bore of the tapered plug and projecting into the outer-most end of said plug.

This specification signed and witnessed this sixth day of March, 1920.

CHARLES F. HUMMEL.

Witnesses:
 FRED'K C. FISCHER,
 FERDINAND NOLL.